Patented Nov. 11, 1941

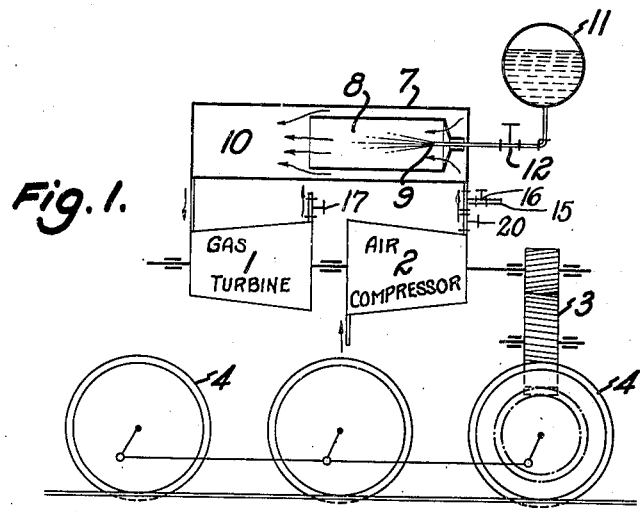
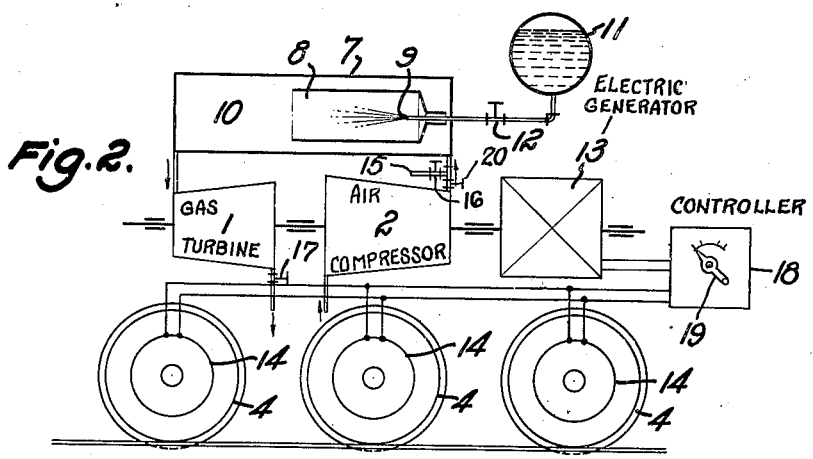

2,262,699

UNITED STATES PATENT OFFICE 2,262,699

METHOD OF BRAKING

Hans Pfenninger, Wettingen, Switzerland, assignor to Aktiengesellschaft Brown, Boveri & Cie., Baden, Switzerland Application November 7, 1939, Serial No. 303,333
In Germany November 22, 1938

9 Claims. (Cl. 105—26)

This invention relates to a method of braking vehicles and the like which are driven by a gas turbine which also drives its compressor.

In gas turbines that drive their compressor, the available power is the difference between the actual power of the gas turbine and the consumption of power by the compressor. If the gas turbine is a so-called uniform pressure gas turbine with low motive gas temperature and if the motive gas temperature reduction is accomplished by mixing in much air, the consumption of power by the compressor generally amounts to a multiple greater than one of the useful power. In order to obtain useful power, the efficiency of the gas turbine and the compressor must be good, and in addition the absolute admission temperature of the motive gas in the gas turbine must amount to a certain multiple of the absolute admission temperature of the air in the compressor. If the motive gas temperature drops below a certain height, the useful power of the plant will be equal to zero, for instance, if the gas turbine power is equal to the power used by the compressor, or it will even be negative if the gas turbine power is less than the compressor consumption.

This characteristic can be used for braking in locomotives, ships or similar devices that have a gas turbine as direct or indirect driving engine. Hereby the great advantage is obtained that high braking power becomes possible without requiring special expensive or complicated arrangements, as, for instance, special braking devices, devices for carrying off the heat liberated during the braking operation, etc.

The present application relates to the use of the gas turbine plant for braking vehicles or the like provided with gas turbine drive.

The invention will be more particularly described for the purpose of illustration with reference to the accompanying drawing in which:

Fig. 1 is a diagrammatic representation of one embodiment of the invention; and

Fig. 2 is a diagrammatic representation of a modified embodiment of the invention.

In Fig. 1, for instance, a diagram of a motive power plant for a locomotive is shown having a direct drive through a gear-wheel gearing. 1 is the gas turbine, 2 the compressor. The gearing 3 transmits the power to the wheels 4. 7 is the producer of the motive gas. In general, it consists of the combustion chamber 8, in which fuel introduced through nozzle 9 is burned with a slight excess of air, and the mixing chamber 10 in which the hot combustion gases are mixed with a large quantity of air, so that the motive gases are given the moderate temperature (between 500 and 600° C.) necessary for safe operation of the gas turbine. Instead of one gas turbine, a number could be used, each of which drives one pair of wheels or a number of the same. 11 is the fuel container, and 12 a regulating valve.

If the temperature of the motive gases amounts to 550° C., for instance, and the gas turbine attains an efficiency of about 84%, and the compressor an efficiency of about 80%, and if the plant is built, for instance, for 1000 H. P. useful power, the compressor will receive about 3000 H. P. and the gas turbine will provide 4000 H. P. If the plant is running at full speed, and if the fuel is withdrawn suddenly from the gas turbine, the compressor first retains its driving power, but the power of the gas turbine quickly drops to the value that corresponds to the temperature which is now considerably lower and is maintained only by the compression, for example, about 180° C. The gas turbine then furnishes only about 2000 H. P. instead of 4000 H. P. The missing power must be made up by the driving wheels and the vehicle is, therefore, braked the more the higher its speed. With decreasing vehicle speed, the braking effect likewise diminishes. The reduction of power is approximately parabolic. The braking power, however, is considerably greater at high speeds of travel than can ever be obtained by braking with brake shoes. Another difference in braking by the gas turbine from frictional braking is that it occurs without additional development of heat. The driving machine that forms the brake device operates at a lower temperature during the braking than in normal operation.

The braking effect can be moderated if the fuel is only partially throttled down. It can be increased if a part of the compressed air is blown out through outlet 15 controlled by blow-off valve 16 and only enough is let through the gas turbine as is necessary for preventing heating of the vanes and for maintaining an igniting flame in the combustion chamber. Great braking power is obtained likewise when the air is throttled at the outlet of the compressor by means of throttle valve 20 or of the gas turbine by means of the throttle valve 17. Braking by the gas turbine could, of course, be combined with braking by brake shoes on the driving wheels.

The braking according to the invention is especially effective when the transmission of energy to the wheels is not accomplished by gear wheel gearing, but electrically. In this case, the gas turbine drives a generator that furnishes current for the motors coupled to the wheels. Fig. 2 shows in diagram an example of a motive power plant of this kind. 1 is the gas turbine again, 2 the compressor, 7 to 10 the combustion chamber with accessories. 13 is an electric generator, for instance a direct current generator, 14 are motors that drive the wheels 4 either directly or through a gearing. By means of suitable switches and control of the energizing, already known in themselves, it is possible to impart to the compressor during the braking any desired speed that is independent within certain limits of the momentary speed of the braked vehicle. Such means is illustrated in Fig. 2 by controller 18 operated by switch 19. The absorption of work by the compressor and thereby its braking power remain high therefore even when the speed of travel has greatly diminished.

Suitable generator-motor systems for electrically transmitting the energy between the gas turbine and the driving wheels of the vehicle may be selected from the following alternative examples, and likewise any other known and suitable system may be used.

For the braking, either the field or the armature of the motor is reversed or the motor extraneously excited. Regulation is accomplished by changing the excitation of the generator that now runs as motor and must supply the energy that the gas turbine cannot furnish due to interruption or throttling of its supply of fuel. In order to increase the braking effect, a loading resistance can be connected in parallel to the generator running as motor during the braking. The generator can be furnished with main line excitation, shunt excitation or extraneous excitation. Each of these three excitations can be employed singly or can be combined with one or two of the other excitations. As source of current for the extraneous excitation of the motor operating as generator during the braking, either a battery that feeds the exciting winding through a regulated resistance may be employed or a special generator group may be used, the exciting of the motor being regulated by a resistance or by the exciting of the exciting generator. Finally, the motor may likewise be provided with compound winding, so that upon switching over to braking, a part of the field winding remains in series connection while the other part of the field winding is excited by some source of current extraneously. When a number of driving motors are used, they are connected together according to one of the circuits already known.

Instead of electric transmission of energy, a transmission with hydraulic gearing may be used, that likewise makes possible a change of the transmission ratio during the braking thus increasing the braking effect.

I claim:

1. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine whereby the total power delivered by the turbine is decreased below the amount of power consumed in driving the compressor and the additional power consumed by the compressor is supplied from the driving wheels, thereby applying a positive braking action to the driving wheels.

2. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine by decreasing the temperature of the motive gas whereby the total power delivered by the turbine is decreased below the amount of power consumed in driving the compressor and the additional power consumed by the compressor is supplied from the driving wheels, thereby applying a positive braking action to the driving wheels.

3. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine by decreasing the amount of motive gas whereby total power delivered by the turbine is decreased below the amount of power consumed in driving the compressor and the additional power consumed by the compressor is supplied from the driving wheels, thereby applying a positive braking action to the driving wheels.

4. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine by decreasing the amount of fuel supplied to the gas turbine combustion chamber while maintaining the full supply of compressed air thereto whereby the total power delivered by the turbine is decreased below the amount of power consumed in driving the compressor and the additional power consumed by the compressor is supplied from the driving wheels, thereby applying a positive braking action to the driving wheels.

5. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine by blowing off a portion of the compressed air supplied by the compressor whereby the total power delivered by the turbine is decreased below the amount of power consumed in driving the compressor and the additional power consumed by the compressor is supplied from the driving wheels, thereby applying a positive braking action to the driving wheels.

6. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine by throttling the compressed air supplied to the turbine whereby the total power delivered by the turbine is decreased below the amount of power consumed in driving the compressor and the additional power consumed by the compressor is supplied from the driving wheels, thereby applying a positive braking action to the driving wheels.

7. The method of braking vehicles and the like which are powered by a power plant comprising a continuous flow gas turbine, a combustion chamber supplying combustion gases to said turbine, a compressor driven by said turbine and supplying compressed air to said combustion chamber and means interconnecting said turbine and the driving wheels of said vehicle for transmission of power from said turbine to said wheels and from said wheels to said turbine, which comprises decreasing the effective energy content of the motive gas supplied to the turbine by throttling the exhaust gases issuing from the turbine whereby the total power delivered by the turbine is decreased below the amount of power consumed in driving the compressor and the additional power consumed by the compressor is supplied from the driving wheels, thereby applying a positive braking action to the driving wheels.

8. The method of braking vehicles and the like which are powered by a power plant comprising a continuous flow gas turbine, a combustion chamber supplying combustion gases to said turbine, a compressor driven by said turbine and supplying compressed air to said combustion chamber and a generator-motor system interconnecting said turbine and the driving wheels of said vehicle for transmission of power from said turbine to said wheels and from said wheels to said turbine, which comprises decreasing the effective energy content of the motive gas supplied to the turbine whereby the total power delivered by the turbine is decreased below the amount of power consumed in driving the compressor and the additional power consumed by the compressor is supplied from the driving wheels through the generator-motor system, the motor acting as generator and the generator acting as motor for partially driving the compressor, thereby applying a positive braking action to the driving wheels.

9. The method of braking vehicles and the like which are powered by a power plant comprising a continuous flow gas turbine, a combustion chamber supplying combustion gases to said turbine, a compressor driven by said turbine and supplying compressed air to said combustion chamber and means positively connecting said turbine and the driving wheels of said vehicle for transmission of power from said turbine to said wheels and from said wheels to said turbine, which comprises decreasing the effective energy content of the motive gas supplied to the turbine whereby the total power delivered by the turbine is decreased below the amount of power consumed in driving the compressor and the additional power consumed by the compressor is supplied from the driving wheels, thereby applying a positive braking action to the driving wheels.

HANS PFENNINGER.